(12) United States Patent
Hiruma et al.

(10) Patent No.: US 7,952,737 B2
(45) Date of Patent: May 31, 2011

(54) PRINT PROCESS SYSTEM AND COMPUTER READABLE MEDIUM

(75) Inventors: Takashi Hiruma, Kanagawa (JP);
Hajime Kajiyama, Kanagawa (JP);
Tomonari Yamauchi, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 975 days.

(21) Appl. No.: 11/528,621

(22) Filed: Sep. 28, 2006

(65) Prior Publication Data
US 2007/0070411 A1 Mar. 29, 2007

(30) Foreign Application Priority Data

Sep. 28, 2005 (JP) ................. P2005-282862
Aug. 16, 2006 (JP) ................. P2006-221859

(51) Int. Cl.
*G06F 3/12* (2006.01)
*H04N 1/00* (2006.01)

(52) U.S. Cl. ...................... 358/1.15; 358/402
(58) Field of Classification Search .......... 358/400, 358/500, 1.9, 402, 1.14–1.18
See application file for complete search history.

(56) References Cited

U.S. PATENT DOCUMENTS

| 6,473,192 B1* | 10/2002 | Kidani et al. | 358/1.14 |
| 7,224,491 B2* | 5/2007 | Shinchi et al. | 358/400 |
| 2002/0140989 A1* | 10/2002 | Shinchi et al. | 358/402 |

FOREIGN PATENT DOCUMENTS

| JP | 2004-214731 A | 7/2004 |
| WO | 02/21293 A1 | 3/2002 |

OTHER PUBLICATIONS

Chinese Office Action dated Jan. 25, 2008.

* cited by examiner

*Primary Examiner* — James A Thompson
(74) *Attorney, Agent, or Firm* — Sughrue Mion, PLLC

(57) ABSTRACT

A print process system includes a receiving section and an executing section. The receiving section receives (i) print data or reference information of the print data, (ii) an instruction of print process for the print data and (iii) process description data, which describes a series of processes performed after the print process, or reference information to the process description data. When the print process is executed according to the received instruction of the print process, the executing section executes a process based on the series of process instruction elements described in the process description data corresponding to the instruction of the print process.

13 Claims, 6 Drawing Sheets

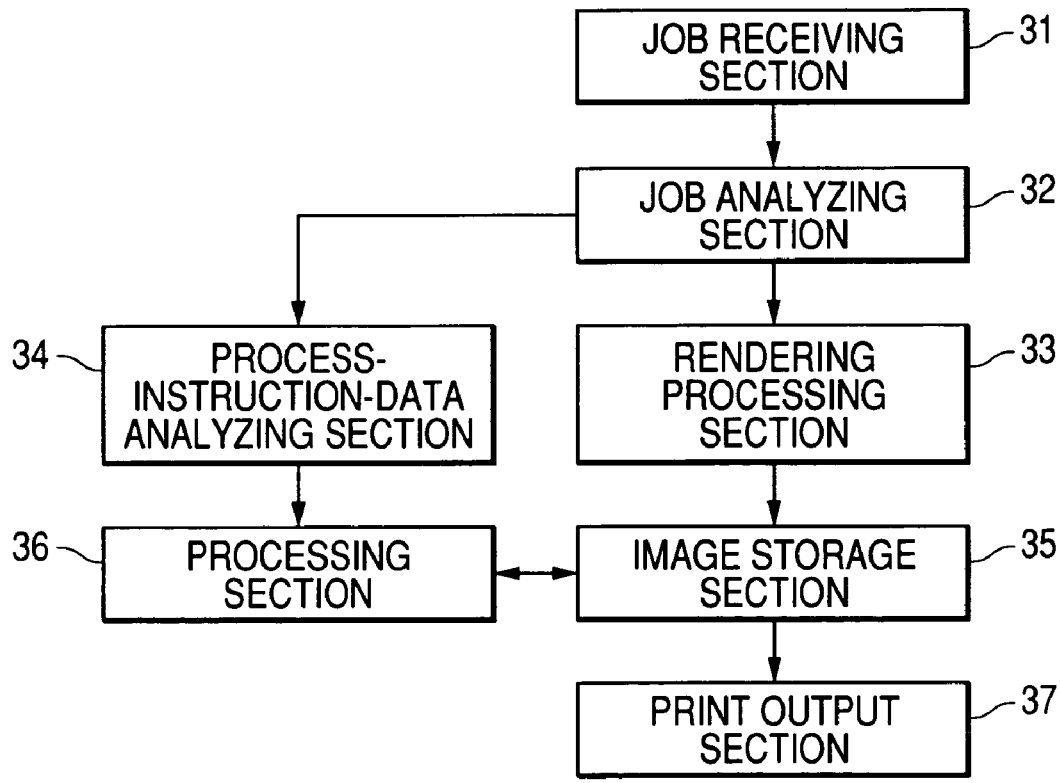

| SYNTHESIZED IMAGE DATA | FORM INFORMATION |
|---|---|
| CONFIDENTIAL | aaaa ··· |
| NOTICE | bbbb ··· |
| ⋮ | ⋮ |

FIG. 7

STAMP EDIT

NOTICE

REGISTERED NAME (O)
NOTICE

CHARACTER STRING OF STAMP (N)
NOTICE

CHARACTER
FONT NAME (F)          SIZE (S)
MS P GOTHIC            54      B  I

COLOR (C)
■ RED     ARBITRARY COLOR (M)
□ TRANSMISSIVE (T)

FRAME
○ NONE (Q)   ○ CIRCLE (R)   ● SQUARE (L)

ANGLE
A
-90°   -45°   0°   45°   90°

ANGLE INPUT
[-90~90°] (A)
0

POSITION (P)
UP
LEFT □□□ RIGHT
     □□□
     □□□
DOWN

□ REPEATEDLY DISPLAY IN ENTIRE IMAGE (Z)

OK    CANCEL    NOTICE DESTINATION    HELP (H)

PRINT PROCESS SYSTEM AND COMPUTER READABLE MEDIUM

BACKGROUND

1. Technical Field

The invention relates to a print process system including a multifunction machine that executes processing according to a process instruction, and a computer readable medium storing a concerned program.

2. Description of the Related Art

In recent years, with the progress of a high-functional multifunction machine, various processings, such as printing, facsimile (FAX) transmission, and electronic mail transmission of a document received through a network can be instructed and performed.

SUMMARY

According to an aspect of the invention, a print process system includes a receiving section and an executing section. The receiving section receives (i) print data or reference information of the print data, (ii) an instruction of print process for the print data and (iii) process description data, which describes a series of processes performed after the print process, or reference information to the process description data. When the print process is executed according to the received instruction of the print process, the executing section executes a process based on the series of process instruction elements described in the process description data corresponding to the instruction of the print process.

BRIEF DESCRIPTION OF THE DRAWINGS

Exemplary embodiments of the invention will be described in detail based on the following figures, wherein:

FIG. 3 is a diagram illustrating an example of a drawing object included in image data transmitted to an image processing apparatus according to the exemplary embodiment of the invention;

FIG. 4 is a functional block diagram showing an example of the image processing apparatus according to the exemplary embodiment of the invention;

FIG. 7 is a diagram illustrating an example of a driver interface provided by the information processing apparatus according to the exemplary embodiment of the invention.

DETAILED DESCRIPTION

Figure 1:
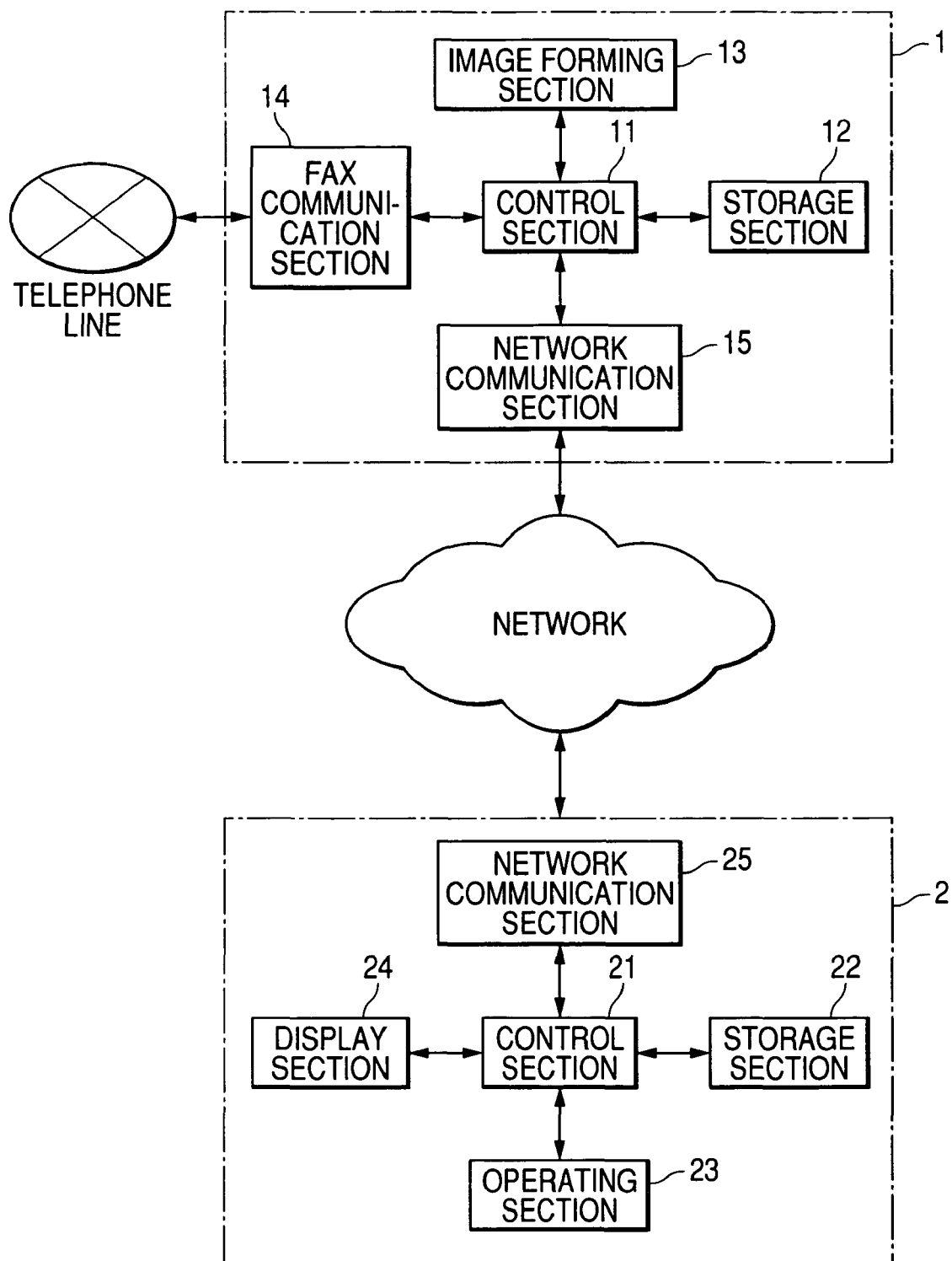
FIG. 1 is a block diagram showing a system including an image processing apparatus according to an exemplary embodiment of the invention.

Hereinafter, exemplary embodiments of the invention will be described with reference to the drawings. A print process system according to this exemplary embodiment of the invention includes an image processing apparatus 1, as shown in FIG. 1. Further, the print process system may include a personal computer (PC) 2 connected to the image processing apparatus 1. The image processing apparatus 1 and the PC 2 are connected to each other through a network. The image processing apparatus 1 includes a control section 11, a storage section 12, an image forming section 13, a FAX communication section 14 and a network communication section 15. The PC 2 includes a control section 21, a storage section 22, an operating section 23, a display section 24 and a network communication section 25.

The control section 11 of the image processing apparatus 1 may be implemented by a CPU. The control section 11 executes a program stored in the storage section 12. The control section 11 receives image data and process description data, in which process to be executed is described, from the PC 2 so as to store the received image data and the received process description data in the storage section 12. Further, print data and the process description data may be stored in the PC 2, a file server (not shown) or the storage section 12 of the image processing apparatus 1. In this case, the control section 11 may receive reference data of those stored data, and perform a process based on the received reference data. In the process description data, at least one process instruction element to be selectively executed depending on a condition is described. "Process instruction element" is a group of commands each of which describing a process performed on print data (e.g., PDL) or image data generated based on the print data. Further, examples of the "process instruction element" include various instructions such as printing out, FAX transmitting, storing in a file server, sending a mail, and executing a process using an application server. Specific process of the control section 11 will be described later in detail.

The storage section 12 includes a memory element such as RAM or ROM, and/or a disc device such as a hard disk. The storage section 12 stores a program to be executed by the control section 11. Further, the storage section 12 operates as a work memory of the control section 11.

In accordance with an instruction input from the control section 11, the image forming section 13 functioning as a printer engine forms an image on a medium such as a sheet of paper, based on the image data. The FAX communication section 14 is connected to a telephone line network. According to an instruction input from the control section 11, the FAX communication section 14 calls a telephone number of a destination and communicates with the destination so as to distribute contents of the image data through the telephone lines.

The network communication section 15 is a network interface. In accordance with an instruction input from the control section 11, the network communication section 15 transmits information to a designated destination through a network. Further, the network communication section 15 receives information coming through the network and outputs the received information to the control section 11.

The control section 21 of the PC 2 may be implemented by a CPU. The control section 21 executes a program stored in the storage section 22. In accordance with instruction operation by a user, the control section 21 transmits image data to be processed to the image processing apparatus 1. In this exemplary embodiment, a driver program for transmitting image data to the image processing apparatus 1 is installed in the PC 2. The driver program is read from a process program, which processes image data to be processed. Then, the read driver program is executed. In this exemplary embodiment, in the course of execution of the driver program, selected or generated is process description data in which process relating to image data and to be executed on the image processing apparatus 1 side is described. Then, the process description data is transmitted together with the image data. Specific process of the control section 21 according to the driver program will be described later in detail.

The storage section 22 includes a memory element such as RAM or ROM, and/or a disc device such as a hard disk. The storage section 22 stores programs (such as a process program and a device program) to be executed by the control section 21. Further, the storage section 22 also operates as a work memory of the control section 21. The storage section 22 stores form data of the process description data. The "form data" will be described later in detail.

The operating section 23 is a keyboard or mouse. The operating section 23 receives instruction operation of a user and outputs contents of the instruction operation to the control section 21. The display section 24 is a display, and displays an image according to an instruction input from the control section 21. The network communication section 25 is a network interface and transmits information to a designated destination through a network according to an instruction input from the control section 21. Further, the network communication section 25 receives information coming through a network and outputs the received information to the control section 21.

[Generation of Process Description Data]

In the PC 2, the process description data may be previously prepared or may be generated in the process performed by the device program. The case where the control section 21 of the PC 2 generates process description data in the process performed by the device program will now be described.

The PC 2 receives an instruction of transmitting image data processed by a user using the process program to the image processing apparatus 1, and starts process of the driver program. Further, in the driver program, the PC 2 displays a list of process description data previously stored in the storage section 12 so as to display a message requesting to select process description data to be transmitted together with image data from the displayed list.

Figure 2A:
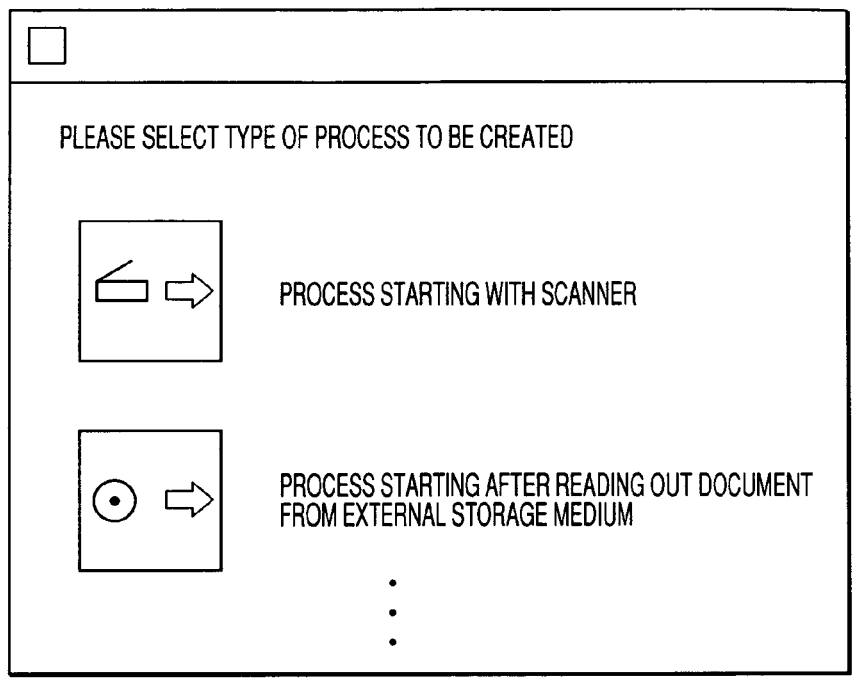
FIGS. 2A and 2B are diagrams illustrating an example of an interface used for generating process description data, according to the exemplary embodiment of the invention.

If the user gives an instruction of generating new process description data, the control section 21 presents an interface screen shown in FIG. 2A. On the interface screen, icons corresponding to data providing the start of process are arranged. For example, process starting from scan and process beginning with reading a document from an external memory medium may be selected.

Figure 2B:
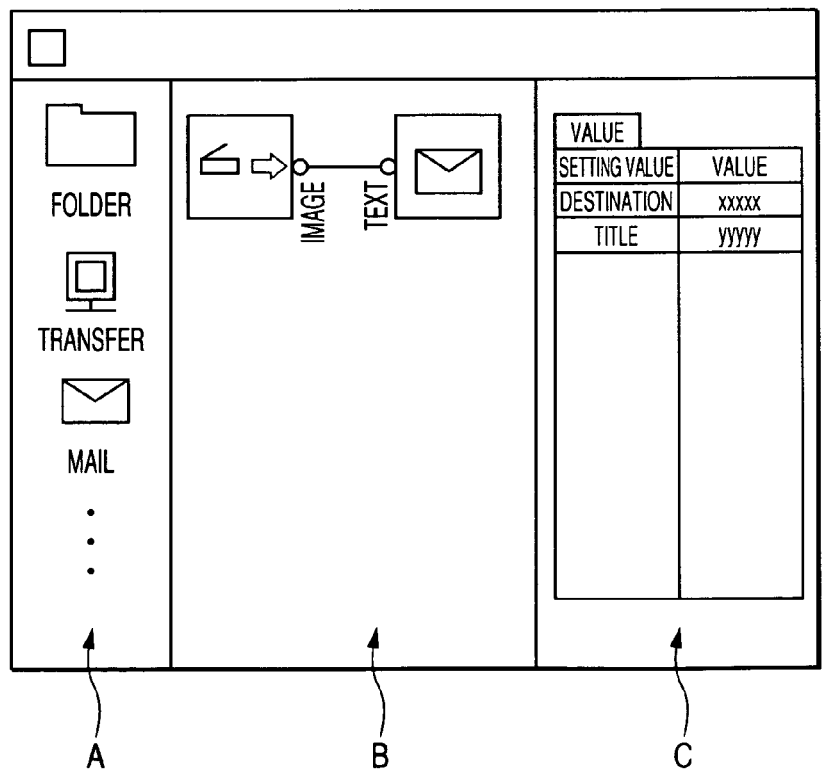

When a user performs an instruction operation to select any one of the icons, then the user further selects another icon corresponding to a subsequent process to be performed on a document, which can be obtained by performing a process corresponding to the firstly selected icon. The user designates processes while connecting the respective icons with line in such a manner that a flow chart is created (FIG. 2B). Process icons are arranged in an icon pane A in the left side of the screen. For example, icons corresponding to other processes such as storing in a folder, transferring a file, sending a mail, FAX transmission and printing are prepared.

If the user selects one icon from the arranged icons, the selected icon is displayed on a main pane B where a flow chart is created. Then, a line is drawn between the selected icon and the previously selected icon. The line indicates that a process is performed subsequently to the result of the process in the previous stage. Further, if one of the icons displayed in the main pane B is selected, a setting-value input pane C is displayed. In the setting-value input pane C, detailed setting values of the process corresponding to the selected icon can be input. For example, when a scan icon is selected, "scan" as a function name and a screen for setting process parameters is displayed. The processing parameters may include a reading size, a direction of a placed document, selection of an image quality, a color mode (monochrome or color) and resolution. Using these screens, the user generates process description data that describes a series of process steps.

For example, in the case where process description data for transmitting a document read by a scanner via an electronic mail is generated, the user selects "process beginning with scan" from the screen shown in FIG. 2A. Then, the screen shown in FIG. 2B is displayed, and an icon indicating scan is displayed on the main pane B.

The PC 2 stores process commands corresponding to the respective icons in the storage section 22. The process command represents a process instruction with respect to the control section 11 of the image processing apparatus 1. In this exemplary embodiment, the process description data includes at least one process instruction element to be selectively executed depending on a condition. As a specific example, a process instruction element to be executed on a condition that lack of paper has occurred while an image is formed on A4 paper can be set to a command, such as 'substitute with B4'.

In this case, icons such as "printing image data" and "process in response to occurrence of error" are selected on the screen shown in FIG. 2A. Further, "out of paper" is set as a parameter of the "process in response to occurrence of error." Next, from the command icons, "setting paper size to B4" is selected, and "continuing image formation" is selected. Then, lines connecting these selected icons in the sequence of processes are drawn.

The control section 21 of the PC 2 arranges the commands set to the respective icons in the sequence of the drawn lines so as to generate process instruction data (process description data). Further, the control section 21 transmits image data and the process instruction data (process description data) to the image processing apparatus 1.

[Processing Based on Process Description Data]

When receiving the image data and the process instruction data (process description data), the control section 11 of the image processing apparatus 1 stores the image data and the process instruction data in the storage section 12 while associating the image data and the process instruction data.

Then, the control section 11 reads the process instruction data, and sequentially executes processes according to the commands included in the process instruction data. For example, if the instruction of "printing image data" is included in the process instruction data at the first position as described above, the control section 11 reads from the storage section 12 the associated image data in accordance with the instruction and outputs the read image data to the image forming section 13 to start printing. Further, if an error occurs during the printing and this error is "out of paper," the control section 11 examines whether or not process responding to the out of paper is described in "process in response to occurrence of error." In this case, if the instruction of "setting paper size to B4" and the instruction of "continuing image formation" are described in the process instruction data as described above, the control section 11 instructs the image forming section 13 to set the paper size to B4 and further instructs the image forming section 13 to continue the image formation. Accordingly, the image processing apparatus 1 of this exemplary embodiment executes processes according to process instruction elements of selectively continuing printing with B4 depending on the condition that the error "out of paper" occurs. Since the image processing apparatus 1 executes various processes in a conditional branching manner, the image processing apparatus 1 can execute processes flexibly.

[Modifications]

On the interface screen for generating the process instruction data, the control section 21 of the PC 2 may selectively include icons into the icon pane, based on contents of input image data input, which a process target. Therefore, the control section 21 stores respective icons while associating with the icons with a hidden condition. For example, with regard to an icon for FAX transmission, "input image data is color image data" is set as a hidden condition. That is, in this case, if color image data is input into the PC 2, the control section 21 does not display the icon for FAX transmission. Accordingly, the control section 21 displays executable processes in the icon pane based on the image data. Therefore, process instruction data can be created easily.

Even though the user is prompted to select process description data from among the process description data previously generated, the control section 21 may selectively display process description data as selection candidates, according to the contents of the input image data. In this case, when the image data satisfies a logical sum (OR) of the hidden conditions associated with the respective icons, the control section 21 displays the satisfying process description data. For example, it is assumed that certain process description data includes icons of "FAX transmission", "in case of error", and "sending a mail" and "color" is set as a hidden condition of "FAX transmission" and "size is 500 K byte or more" is set as a hidden condition of "mail transmission." In this case, if image data satisfies a condition "color" or "size is more than 500 K byte," the control section 21 does not display process description data corresponding to "FAX transmission" or does not display process description data corresponding to "sending a mail" as a selection candidate.

In contrast, the control section 21 may selectively display as formation candidates, image data accommodating generated process instruction data or generated or selected process description data after user's selection is made. Then the control section 21 may allows a user to select image data as an image formation target.

In this case, the control section 21 previously receives designation of plural pieces of image data as process candidates and accumulates and stores the designated image data in the storage section 22. Further, the control section 21 selectively displays image data, which don't satisfy a logical sum (OR) of hidden conditions associated with respective icons included in the generated or selected process description data, from the image data accumulated as the candidates of processes. Then, the control section 21 allows the user to select a process target from the displayed image data. Thereafter, the control section 21 transmits the selected image data and the generated or selected process instruction data to the image processing apparatus 1.

Further, the control section 21 may generate process instruction data or receive selection of process instruction data in advance. The control section 21 notices a logical sum (OR) of hidden conditions associated with respective icons included in the generated or selected process description data to a process program, which processes an image. The process program may perform control so as to form no images, which don't satisfy the noticed condition. For example, when process instruction data including "FAX transmission" is generated or selected, the control section 21 receives the notice of a condition indicating that no color image data can be received. Thereby, the control section 21 performs control so that "color" image data is not generated (for example, a user is allowed to select only 'monochrome' or 'gray scale' as a color mode).

In the process of the device program, the control section 21 may include a process command, which is to be previously added in association with contents of image data input as an process target, into the process instruction data generated or selected by a user. Then, the control section 21 may transmit resultant process instruction data to the image processing apparatus 1. For example, when the input image data is halftone-dot data, the control section 21 may add a command instructing moire removal.

In the process of the device program, the control section 21 may perform the following process. The control section 21 receives settings of a password table in which users' names and passwords are associated with each other, and stores the settings of password table in the storage unit 21. Referring to bibliographic information (information such as document name or user's name) about image data input as a process target, the control section 21 may generate such process description data that printing is performed after a user's name and password are input. Then, this process description data includes command sequence of (i) examining whether or not the input user's name and the input password respectively coincide with a user's name included in bibliographic information about the input image data and a password, which is set in the password table in association with the user's name; and (ii) performing printing only when they coincide with each other.

The commands included in the process instruction data may include a process based on contents of a drawing object included in the image data. For example, it is assumed that there is a table in which description information of mail addresses and check signals are associated with each other, as a drawing object (see FIG. 3). In this case, such a command may be provided that after referring to the table, "sending a mail to mail addresses having check signal attached." In this case, as the process based on the command, the control section 11 of the image processing apparatus 1 specifies an object, which is designated as a drawing object to be referred to, among the drawing objects included in the received image data. Referring to the specified drawing object, the control section 11 obtains mail addresses corresponding to entries having a check signal attached and sends mails to the obtained mail addresses. In this case, if the image data is data described in a page description language, the control section 11 refers to the description relating to the designated drawings object, obtains the description of the mail addresses, which are designated as information to be drawn adjacently to the drawing instruction of a check sign and sends mails to the obtained mail addresses.

In the case where image data to be processed includes data of plural pages, the control section 21 may associate generated or selected process instruction data with any of the pages. For example, a request for quotation and a request for decision are created as one document, and the image data of the document is transmitted to the image processing apparatus 1. Further, process instruction data including an instruction for FAX transmission to a requesting place is associated with the page of the request for quotation. Further, an address of a place requesting decision is described in the page of the request for decision, and process instruction data including an instruction of 'when FAX transmission to requesting place is completed, transmit page of request for decision' may be associated therewith.

As such, different process instruction data are respectively associated with the pages. Therefore, an instruction of a more flexible process can be made.

[Instruction Beginning with Printer]

When the image processing apparatus 1 has a function as a printer, the PC 2 may transmit print instruction (instruction of image formation) and process instruction data. In accordance with a program executed by the control section 11, the image processing apparatus 1 having a function of a printer includes a job receiving section 31, a job analyzing section 32, a drawing process section 33, a process-instruction-data analyzing section 34, an image storage section 35, a processing section 36 and a print output section 37, as shown in FIG. 4.

Figures 5, 6:
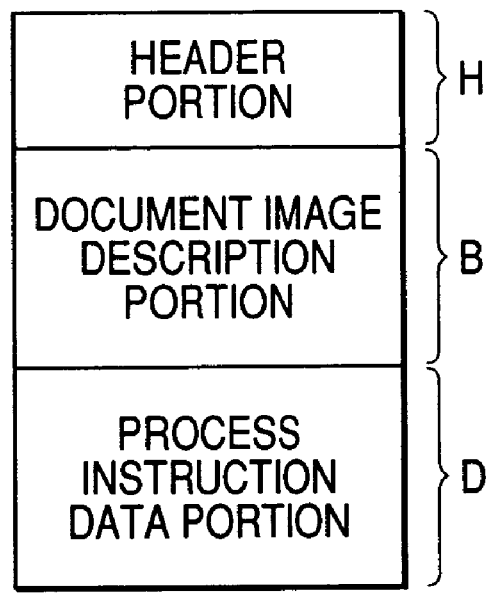
FIG. 5 is a diagram illustrating a content example of a print instruction transmitted by an information processing apparatus according to the exemplary embodiment of the invention.
FIG. 6 is a diagram illustrating an example of form information provided by the information processing apparatus according to the exemplary embodiment of the invention.

In this exemplary embodiment, the PC 2 transmits to the image processing apparatus 1 a print instruction of a document and a process instruction to be executed in association with the document, which is a target of the print instruction. At this time, the PC 2 transmits a series of data as a print instruction including a header portion H, a document image description portion B, and a process instruction data portion D, as shown in FIG. 5.

The job receiving section 31 receives a series of data including the process instruction data, which is a print instruction, from the PC 2 and issues a unique job identifier. Further, the job receiving section 31 outputs the received print instruction and the issued job identifier to the job analyzing section 32. The job analyzing section 32 distinguishes the document image description portion B and the process instruction data portion D, which are included in the print instruction, and outputs the job identifier and information of the document image description portion B to the drawing process section 33. Further, the job analyzing section 32 outputs the job identifier and information of the process instruction data D to the process-instruction-data analyzing section 34.

Based on the described contents of the document image description portion B, the drawing process section 33 generates bitmap image data and outputs the generated bitmap image data to the image storage section 35 while associating the generated bitmap image data with the job identifier. The process-instruction-data analyzing section 34 receives the process instruction data and the job identifier. Further, the process-instruction-data analyzing section 34 sets as a process target bitmap image data, which is associated with the same job identifier as the received job identifier and is stored in the image storage section 35. The process-instruction-data analyzing section 34 outputs a process instruction, which is based on the received process instruction data, to the processing section 36.

The image storage section 35 stores image data in the storage section 12. Further, the image storage section 35 reads instructed image data. The processing section 36 receives an instruction of a process to be executed and a job identifier for specifying a process target from the process-instruction-data analyzing section 34. The processing section 36 reads image data specified by the received job identifier from the image storage section 35, and performs a process according to the received instruction. Examples of content of the process will be described later. The print output section 37 prints the image data stored in the image storage section 35.

Here, the examples of the content of the process to be performed by the processing section 36 will be described. In this exemplary embodiment, the following process instructions may be sent from the PC 2:
 (1) format conversion of bitmap image
 (2) OCR (Optical Character Reader) processing
 (3) mail transmission
 (4) FAX transmission
 (5) file transfer In the format conversion process of a bitmap image, resolution conversion, size reduction and expansion, clipping of a designated region and the like may be included in addition to an instruction of conversion into a designated format (for example, JPEG (Joint Picture Experts Group) format).

In the OCR processing, character images included in a bitmap image are detected and generated as character string data. The OCR processing is performed by a known method, such as pattern matching. Further, the generated character string data (results of reading) are transmitted to a designated transmission destination by electronic mail or the like.

The mail transmission is to control the network communication section 15 so as to transmit designated image data to a designated destination by electronic mail. Similarly, the FAX transmission is to transmit designated image data to a designated destination through a facsimile. In the processing, the FAX communication section 14 is controlled to call a telephone number of the designated destination. If the destination receives the call, the designated image data is transmitted to the destination through a facsimile protocol.

The file transfer is to control the network communication section 15 so as to transmit designated image data to a designated destination through a file transfer protocol (for example, FTP (File Transfer Protocol), WebDAV (Web-based Distributed Authoring and Versioning) or the like).

Process instructions may be combined. For example, the process instructions may be an instruction about a series of process steps on document data, such as "(Step 1) performing OCR processing, (Step 2) integrating resultant character strings and image and transmitting the integration result to designated destination via an electronic mail, and (Step 3) storing the character strings and the image in server through file transfer."

In this exemplary embodiment, when process instruction data and a print instruction are transmitted to the image processing apparatus 1 from the PC 2, the PC 2 integrates the print instruction and the process instruction data so that the image processing apparatus 1 receives the print instruction and the process instruction data as a single job. Accordingly, in the image processing apparatus 1, it is easy to allocate a common job identifier to the print instruction and the process instruction data corresponding to the print instruction. For example, even when an error occurs in a process instruction, it is possible to inform an error in association with the job identifier. Further, by informing that an error is present in the process instruction transmitted with the image data associated with the same job identifier, a user can easily recognize whether or not the process instruction has an error.

[Creation of Process Instruction]

When a process instruction to be transmitted with the print instruction is created, the PC 2 may perform the following processes.

That is, when the instruction operation of printing a document is performed, the personal computer 2 displays an interface screen of a printer driver for setting the number of print copies, layout, a discharge tray, an image to be superimposed and synthesized and other information.

In this exemplary embodiment, the control section 21 of the PC 2 makes it possible to create various process instructions with respect to a document on the interface screen of printer driver, in addition to the print instruction of the document. For example, the control section 21 may display a list of trays as a discharge destination or may allow a user to be able to select a transmission destination of image data such as an electronic mail address. Further, as a process that is performed before transmission, the format conversion process of bitmap image or the OCR processing may be selected. As such, if the control section 21 allows a user to select image process on an image or select a transmission destination of image data, the user can designate a series of processes, such as image processing or image output after the image processing, on one screen. Therefore, user's convenience can be improved.

Here, it is assumed that the storage section 21 stores a list of electronic mail addresses to be displayed on the screen of discharge destination, in advance. The control section 21 of the PC 2 reads and displays the list stored in the storage section 22. Further, the control section 21 generates instruction information of transmitting image data, with an electronic mail address selected by a user being set to a destination. In this case, plural electronic mail addresses may be selected.

In this exemplary embodiment, at least one predetermined process instruction or a portion of the process instruction may be accumulated, as form information, in the storage section 22 in association with a superposed and synthesized image. As a superposed and synthesized image, there are an image like a stamp, such as "notice, "important," "copying forbidden," or "urgent," and a form image including a ruled line.

According to a setting instruction, the control section 21 of the PC 2 associates image data (synthesized image data) subject to synthesis with a process instruction, which is to be transmitted together with the print instruction when a synthesizing instruction of the synthesized image data is made, or a portion of the process instruction as form information of a series of processes. Then, the control section 21 stores those data in the storage section 22 (FIG. 6).

Here, in the "portion of the process instruction," information to be designated in individual process is set to be a blank in the process instruction. For example, in a transmission instruction of an electronic mail, a transmission destination thereof is set to be a blank. When generating a process instruction, the PC 2 receives input of information that is to be included in the portion set to be a blank.

Hereinafter, the "notice" will be described as a specific example. The "notice", for example, includes a transmission instruction of transmitting image data via an electronic mail and accumulating predetermined data in a file server, and transmitting reference information (URL (Uniform Resource Locators)) of the accumulated data via an electronic mail. It is assumed that a specific destination of each data is set to be a blank. The "notice" is associated with a stamp image including a character string of "notice."

When a user inputs an instruction to print a document by operating the PC 2, the control section 21 of the PC 2 displays the interface screen of a printer driver. On the interface screen, the user may set information, such as the number of print copies or a paper size. Further, the user may perform an operation instruction to synthesize an image like a stamp of "notice," on the interface screen (FIG. 7).

On the interface screen of FIG. 7, a character string (in this example, "notice") included in a stamp image; a font, a size, a color and transparency, which are used in drawings the character string; a shape of frame; presence/absence of the frame; an angle of the frame; a synthesis position may be set. Further, a field for designating "notice destination" may be displayed on the interface screen, and the user is allowed to fill in the displayed field, a mail address as the notice destination.

Upon receiving an instruction to perform printing from a user, the control section 21 of the PC 2 generates data of a document image description portion, which forms an image in which a stamp image of "notice" is synthesized with image data of a document according to an instruction. Further, the control section 21 generates a process instruction data portion, which transmits the synthesized image to the input notice destination (or the respective notice destinations). In addition, the control section 21 connects the document image description portion and the process instruction data portion with a header portion attached thereto, so as to generate a print instruction, and transmits the generated print instruction to the image processing apparatus 1.

The image processing apparatus 1 receives such a print instruction and generates an image in which the stamp image of "notice" is synthesized with the document data to be printed, based on the data of the document image description portion. Further, the image processing apparatus 1 prints the synthesized image and transmits and outputs the synthesized image to a mail address designated as a notice destination with reference to the data of the input process instruction data portion.

As another example, an instruction of generating a process instruction may be associated with a superimposed and synthesized image but be not associated with a process instruction or a form thereof. For example, an instruction of removing addresses of users other than previously registered users from users designated as a destination in the process instruction may be associated with a "confidential" stamp indicating "secret." When an instruction of synthesizing the "confidential" stamp is made, the control section 21 of the PC 2 generates a print instruction. In this case, even though the input instruction contains a process instruction of transmitting via mail is included and addresses designated in the process instruction of transmitting contains an address of a user, which is not previously registered as the destination, the control section 21 removes the address of the non-registered user from the process instruction.

The control section 21 may select form information by using information (for example, additional information such as a user or date) associated with a document to be printed and may generate a process instruction based on the selected form information.

For example, when additional information indicating "copying forbidden" is associated with a document, form information of a series of processing instructions for transferring a document image to a predetermined file server at the time of printing is selected, and a process instruction indicated by the form information is included in a print instruction of document.

Further, when the selected form information is a portion of a process instruction, which is subsequently to be complemented with information of destination, the control section 21 may request a user who made a print instruction of document, to input the information of destination to be subsequently complemented in a portion of the process instruction. In this case, the control section 21 generates a process instruction containing the input information. Further, the control section 21 includes the process instruction in a print instruction of document.

[Checking of Processing Instruction]

The control section 21 of the PC 2 may generate an image indicating the contents of the generated processing instruction by using the icons shown in FIGS. 2A and 2B. In this case, the corresponding icons are arranged in the sequence of the process instruction, and related documents are connected by line so as to be set to a flow chart.

For example, as "process starting with printing," the following processing instructions may be generated.

(1) transfer image data to be processed to a file server (2) transmission of reference information (URL or the like) of a storage destination of the image data in the file server to designated destination (3) transmission of the image data to be processed via mail.

In this case, an icon A indicating "a process starting with a printer" is disposed, and an image connecting an icon B indicating "transfer to filer server" to the icon A by using a line is generated. Further, an icon C indicating "transmitting reference information of storage location to a designated destination" is connected by a line. Moreover, when plural destinations are present, plural icons C for the respective destinations are connected to the icon B by lines.

Similarly, an icon D indicating "transmission of image data to be processed via mail" is connected to the icon A by a line. When plural destinations are present, plural icons D for the respective destinations are connected to the icon A by lines.

[FIG. 1]
- (A) TELEPHONE LINE
- 14: FAX COMMUNICATION SECTION
- 13: IMAGE FORMING SECTION
- 11: CONTROL SECTION
- 15: NETWORK COMMUNICATION SECTION
- 12: STORAGE SECTION
- (B) NETWORK
- 24: DISPLAY SECTION
- 25: NETWORK COMMUNICATION SECTION
- 21: CONTROL SECTION
- 23: OPERATING SECTION
- 22: STORAGE SECTION

[FIG. 2A]
- (A) PLEASE SELECT TYPE OF PROCESS TO BE CREATED
- (B) PROCESS STARTING WITH SCANNER
- (C) PROCESS STARTING AFTER READING OUT DOCUMENT FROM EXTERNAL STORAGE MEDIUM

[FIG. 2B]
- (A) FOLDER
- (B) TRANSFER
- (C) MAIL
- (D) IMAGE
- (E) TEXT
- (F) VALUE
- (G) SETTING VALUE
- (H) DESTINATION
- (I) TITLE
- (F) VALUE

[FIG. 4]
- 31: JOB RECEIVING SECTION
- 32: JOB ANALYZING SECTION
- 33: RENDERING PROCESSING SECTION
- 35: IMAGE STORAGE SECTION
- 37: PRINT OUTPUT SECTION
- 34: PROCESS-INSTRUCTION-DATA ANALYZING SECTION
- 36: PROCESSING SECTION

[FIG. 5]
- H: HEADER PORTION
- B: DOCUMENT IMAGE DESCRIPTION PORTION
- D: PROCESS INSTRUCTION DATA PORTION

[FIG. 6]
- (A) SYNTHESIZED IMAGE DATA
- (B) NOTICE
- (C) FORM INFORMATION

[FIG. 7]
- (A) STAMP EDIT
- (B) NOTICE
- (C) POSITION
- (D) REPEATEDLY DISPLAY IN ENTIRE IMAGE
- (E) REGISTERED NAME
- (F) NOTICE
- (G) CHARACTER STRING OF STAMP
- (H) CHARACTER
- (I) FONT NAME
- (J) MS P Gothic
- (K) SIZE
- (L) COLOR
- (M) RED
- (N) ARBITRARY COLOR
- (O) TRANSMISSIVE
- (P) FRAME
- (Q) NONE
- (R) CIRCLE
- (S) SQUARE
- (T) ANGLE
- (U) ANGLE INPUT
- (V) CANCEL
- (W) NOTICE DESTINATION
- (X) HELP

Figure 8:
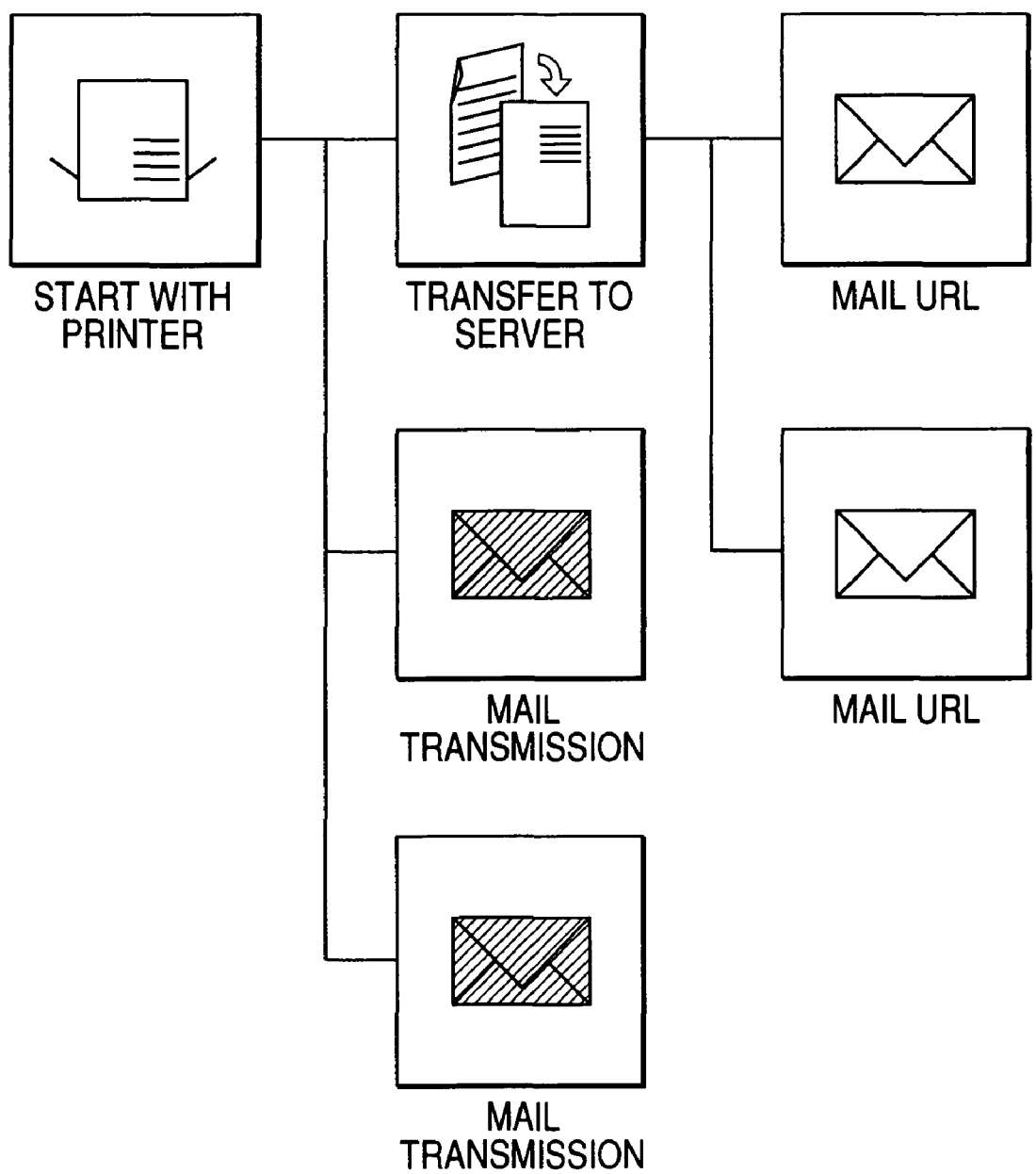
FIG. 8 is a diagram illustrating an example of an interface used for generating and checking process description data generated by the information processing apparatus according to the exemplary embodiment of the invention.

[FIG. 8]
- (A) START WITH PRINTER
- (B) TRANSFER TO SERVER
- (C) MAIL URL
- (D) MAIL TRANSMISSION

What is claimed is:

1. A print process system comprising:
a receiving section that receives (i) print data or print data reference information referencing the print data, (ii) a print process instruction for initiating a print process for the print data and (iii) process description data that describes an instruction about a series of process steps performed after the print process occurs, each process step including a process instruction element, or reference information referencing the process description data;
a print process execution section that executes the print process according to the received print process instruction; and
an executing section that, after the print process is executed according to the received print process instruction, executes a series of process steps based on the instruction described in the process description data corresponding to the print process instruction,
wherein the receiving section receives the print process instruction and the process description data as a single job and allocates a common job identifier to the print process instruction and the process description data, and
the print process system further comprises a notifying section that notifies whether an error occurs in the process based on the plurality of process instruction elements described in the process description data based on the job identifier.

2. The print process system according to claim 1, wherein:
the series of processes are indicated by a user using a user interface of a print driver when the print process is indicated.

3. The system according to claim 2, further comprising:
a storage section that stores form information of the process description data, the form information including at least a portion of the process description data; and a selecting section that selects at least one of the stored form information on a basis of information included in the print data or an instruction input from a user, to generate the process description data on the basis of the selected form information.

4. The print process system according to claim 1, wherein: the series of processes includes processes performed in a conditional branching manner.

5. An image processing method comprising:
receiving (i) print data or print data reference information referencing the print data, (ii) a print process instruction for initiating a printer process for the print data and (iii) process description data that describe an instruction about a series of process steps performed after the print process occurs, each process step including a process instruction element, or reference information referencing the process description data;
executing the print process according to the received print process instruction; and
when the print process is executed according to the received print process instruction, executing a series of process steps based on the instruction described in the process description data corresponding to the print process instruction,
wherein the print process instruction and the process description data are received as a single job and a common job identifier is allocated to the print process instruction and the process description data, and
the image processing method further comprises notifying whether an error occurs in the process based on the series of process instruction elements described in the process description data based on the job identifier.

6. A computer readable medium storing a program causing a computer to execute image processing, the image processing comprising:
receiving (i) print data or print data reference information referencing the print data, (ii) a print process instruction for initiating a print process for the print data and (iii) process description data that describe an instruction about a series of process steps performed after the print process occurs, each process step including a process instructions element or reference information referencing the process description data;
executing the print process according to the received print process instruction; and
when the print process is executed according to the received print process instruction, executing a series of process steps based on the instruction described in the process description data corresponding to the print process instruction,
wherein the print process instruction and the process description data are received as a single job and a common job identifier is allocated to the print process instruction and the process description data, and
the image processing method further comprises notifying whether an error occurs in the process based on the series of process instruction elements described in the process description data based on the job identifier.

7. An image processing apparatus comprising:
a receiving section that receives image data and process description data, which describes at least one process instruction element to be executed selectively depending on a condition, together with an instruction for initiating a process for the image data;
a print process execution section that executes the print process according to the received instruction; and
an executing section that, when the instructed process is performed for the received image data and the condition, which is indicated by the process description data received together with the image data, is satisfied, executes a process based on a process instruction element corresponding to the satisfied conditions,
wherein the process description data and the instruction for initiating the process are received as a single job, and a common job identifier is allocated to the process description data and the instruction for initiating the process, and
the image processing apparatus further comprises a notifying section that notifies whether an error occurs in the process based on the process instruction element corresponding to the satisfied conditions based on the job identifier.

8. An image processing method comprising:
receiving image data and process description data, which describes at least one process instruction element to be executed selectively depending on a condition, together with an instruction for initiating a process for the image data;
executing the print process according to the received instruction; and
when the instructed process is performed for the received image data and the condition, which is indicated by the process description data received together with the image data, is satisfied, executing a process based on a process instruction element corresponding to the satisfied conditions,
wherein the instruction and the process description data are received as a single job, and a common job identifier is allocated to the instruction and the process description data, and
the image processing method further comprises notifying whether an error occurs in the process based on the process instruction element corresponding to the satisfied conditions based on the job identifier.

9. A computer readable medium storing a program causing a computer to execute a process comprising:
receiving image data and process description data, which describes at least one process instruction element to be executed selectively depending on a condition, together with an instruction for initiating a process for the image data;
executing the print process according to the received instruction; and
when the instructed process is performed for the received image data and the condition, which is indicated by the process description data received together with the image data, is satisfied, executing a process based on a process instruction element corresponding to the satisfied conditions,
wherein the instruction and the process description data are received as a single job, and a common job identifier is allocated to the instruction and the process description data, and
the process further comprises notifying whether an error occurs in the process based on the process instruction element corresponding to the satisfied conditions based on the job identifier.

10. A print process apparatus comprising:
a receiving section that receives (i) print data or print data reference information referencing the print data, (ii) a print process instruction for initiating a print process for the print data and (iii) process description data that describe an instruction about a series of process steps performed after the print process occurs, each process step including a process instruction element, or reference information referencing the process description data, the referencing section receiving the print process instruction and the process description data as a single job and allocating a job identifier to the print process instruction and the process description data;

an image forming unit that executes a print process according to the received print process instruction;

an executing section that, after the print process is executed, executes a series of process steps based on the instruction described in the process description data corresponding to the print process instruction; and a notifying section that notifies whether an error occurs in the print process instruction based on the job identifier.

11. The print process apparatus according to claim 10, wherein:

the series of processes are indicated by a user using a user interface of a print driver when the print process is indicated.

12. The system according to claim 11, further comprising:

a storage section that stores form information of the process description data, the form information including at least a portion of the process description data; and a selecting section that selects at least one of the stored form information on a basis of information included in the print data or an instruction input from a user, to generate the process description data on the basis of the selected form information.

13. The print process system according to claim 10, wherein:

the series of processes includes processes performed in a conditional branching manner.

* * * * *